June 28, 1960 K. J. AVERSTEN 2,942,391
METHOD OF MANUFACTURING A SOLDERING METAL PIECE
Filed Oct. 5, 1954 5 Sheets-Sheet 1
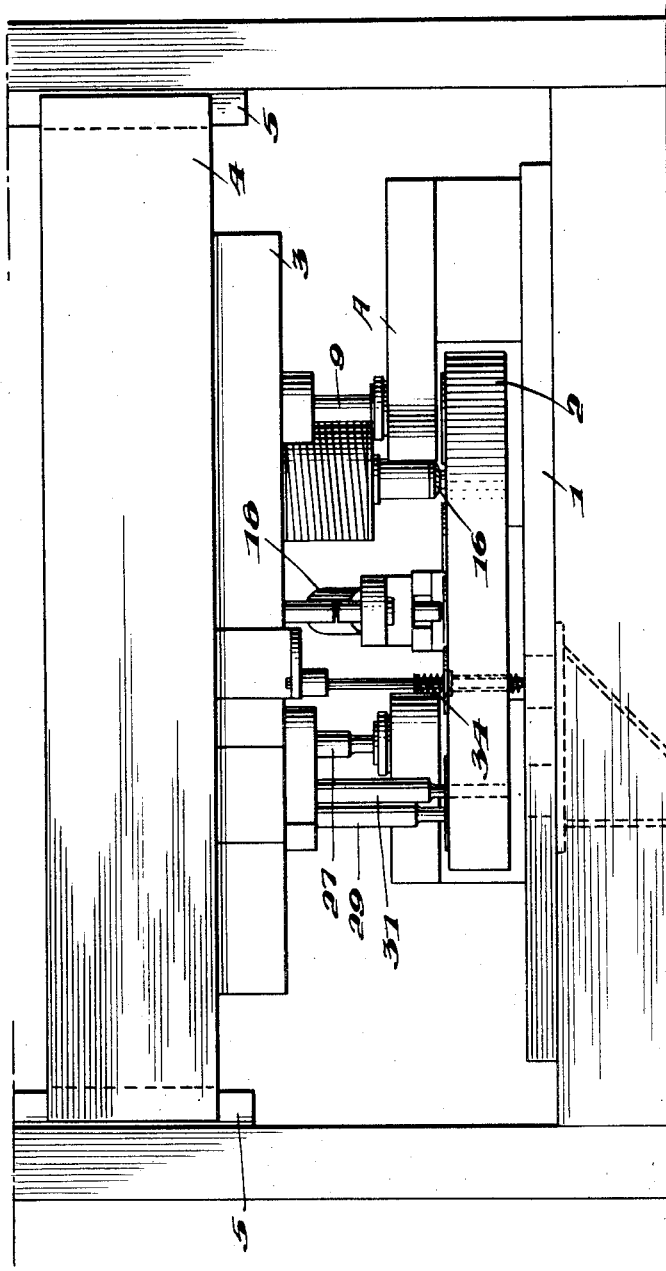
INVENTOR
KARL JOEL AVERSTEN,
BY Robert B. Pearson
ATTORNEY

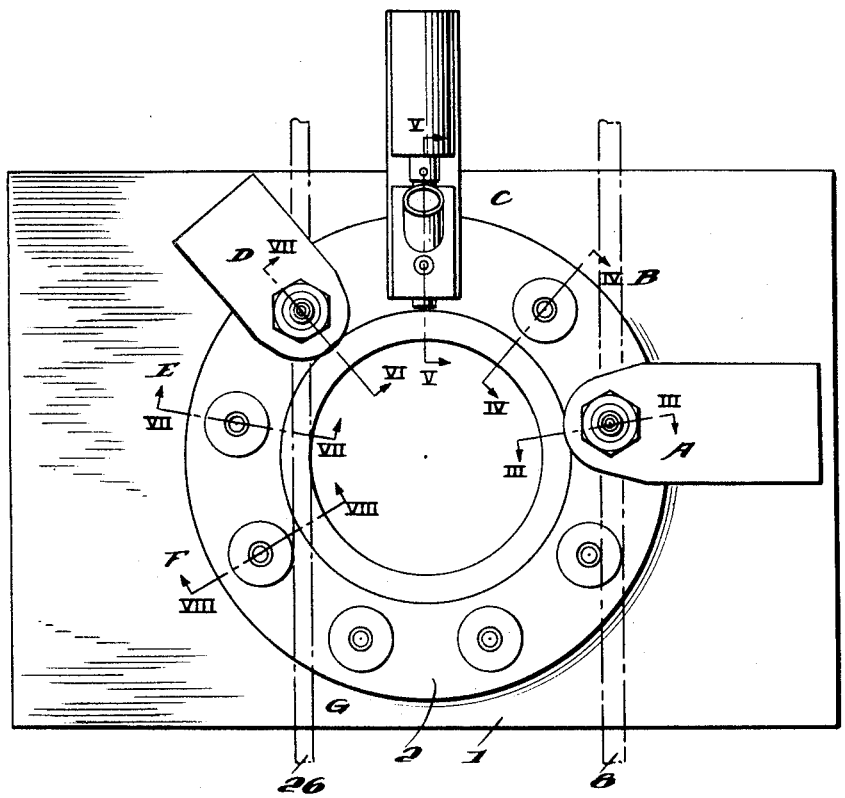

June 28, 1960   K. J. AVERSTEN   2,942,391
METHOD OF MANUFACTURING A SOLDERING METAL PIECE
Filed Oct. 5, 1954   5 Sheets-Sheet 3
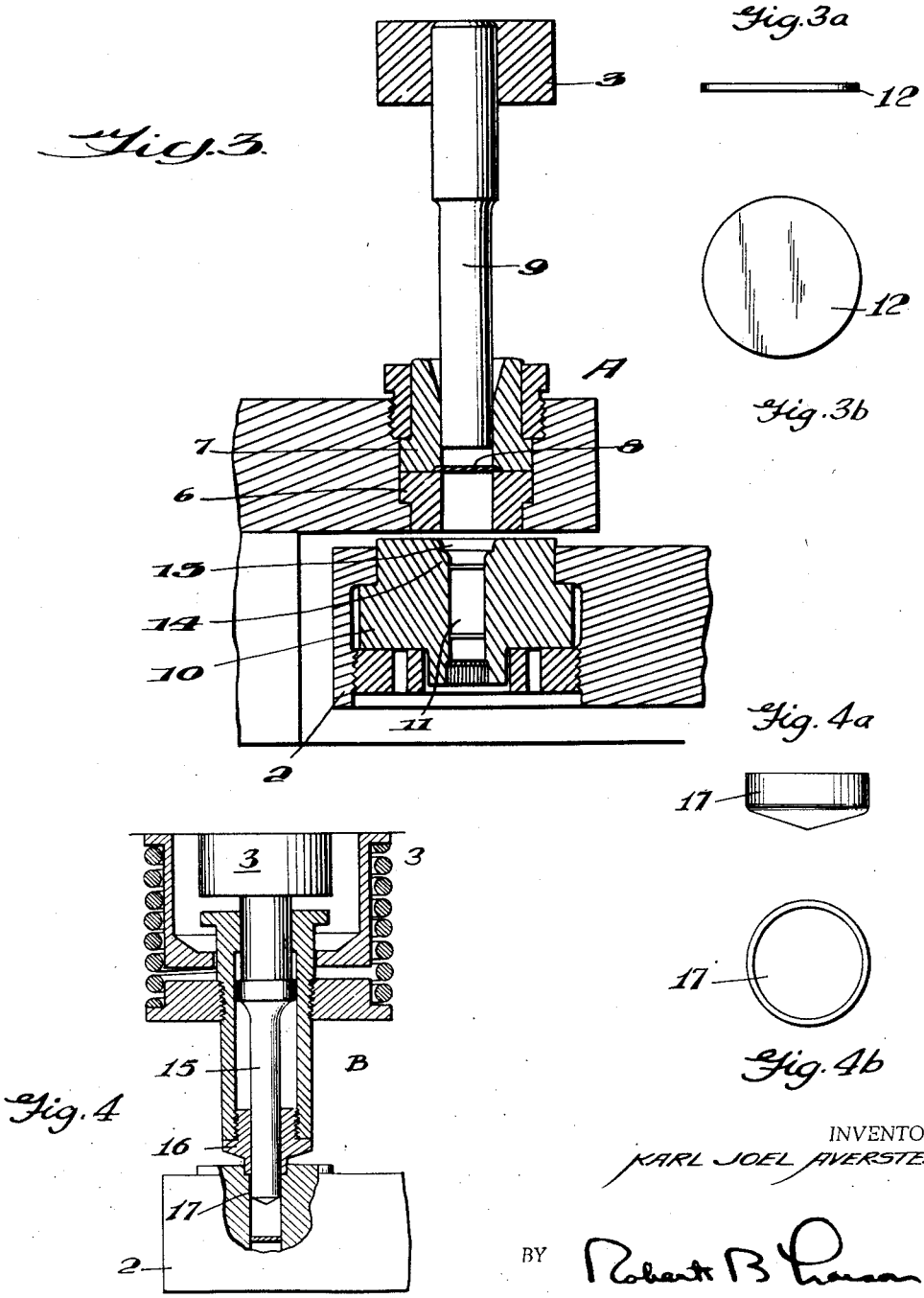
INVENTOR
KARL JOEL AVERSTEN,
BY Robert B. Pierson
ATTORNEY June 28, 1960 K. J. AVERSTEN 2,942,391
METHOD OF MANUFACTURING A SOLDERING METAL PIECE
Filed Oct. 5, 1954 5 Sheets—Sheet 4
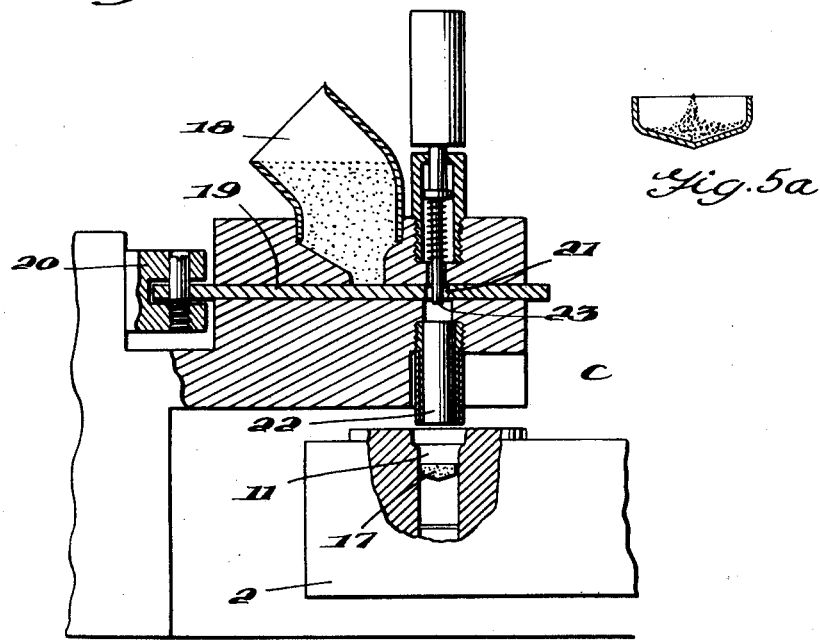
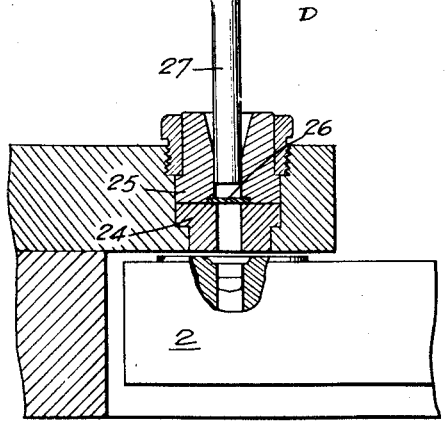
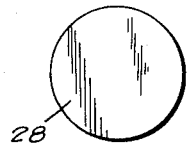
INVENTOR
KARL JOEL AVERSTEN,
BY
ATTORNEY

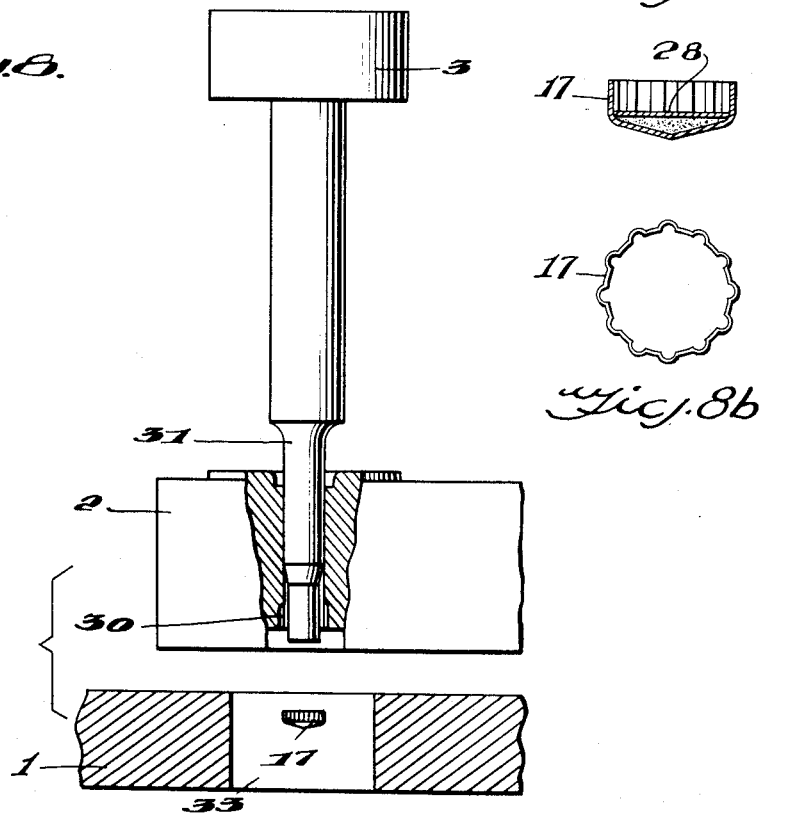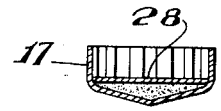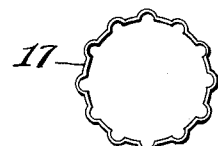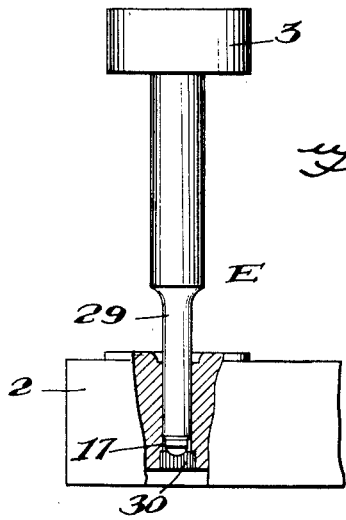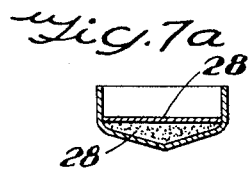

United States Patent Office 2,942,391
Patented June 28, 1960

2,942,391
METHOD OF MANUFACTURING A SOLDERING METAL PIECE

Karl J. Aversten, Lidingo, Sweden, assignor to Svenska Aktiebolaget Gasaccumulator, Lidingo, near Stockholm, Sweden, a corporation of Sweden Filed Oct. 5, 1954, Ser. No. 460,431

Claims priority, application Sweden May 14, 1954

3 Claims. (Cl. 53—30)

The present invention relates to a method of manufacturing a soldering metal piece with enclosed flux to be applied at the end of a metal pin, to make this pin suited for soldering at a metal object by melting of the soldering metal piece by means of an electric arc between this piece and the metal object and the following solidification of the soldering metal. The invention also relates to an apparatus with continuous operations for the manufacture of said soldering metal piece.

The method according to the invention is characterized thereby that a round disc is cut from a soldering metal band and is thereafter put into a forming die and drawn to form a bowl, this bowl being partially filled with flux, and that another round disc is cut from a soldering metal band and let down over the flux in said bowl, whereafter the bowl with flux and disc is by means of a calibration punch driven through a calibration part, consisting of a passage with axial low ridges at its inner side, and the bowl being given axially outside the disc, covering the flux, a corrugated wall, the waves of which having an axial longitudinal direction. The apparatus for said manufacture of soldering metal pieces is according to the invention provided with partly a number of operation units, applied after each other along a transport path and forming a disc cutting tool, a bowl forming tool, a flux filler, a second disc cutting tool, a disc presser and a calibration punch, partly a forming die, mechanically transported along said transport path and having a through passage, the upper part of which is used for the outer forming of a bowl with cylindrical wall and the lower part of which is provided with a calibration part for corrugating the cylindrical wall of the bowl.

The method according to the invention and a preferred form of execution of an apparatus for this purpose are illustrated on the annexed drawings.

Fig. 1 shows a side view of an apparatus according to the invention.

Fig. 2 shows the apparatus in Fig. 1 seen from above, an upper part of the apparatus being, however, removed in order to display the underlying parts more clearly.

Figs. 3–8 show vertical sections according to the lines III—III to VIII—VIII, inclusive, in Fig. 2.

Figs. 3A–8A show on an enlarged scale the soldering metal piece of the corresponding Figs. 3–8 in elevation; and Figs. 3B, 4B, 6B and 8B show the sodering metal piece in plan view.

The apparatus, Figs. 1, 2, comprises a frame 1, a turnably disposed circular table 2 applied thereon, a number of operation units or stations A–G, attached to the frame 1 and distributed along the edge of the table, and a supporting plate 3, applied somewhat above the table 2, with a tool at each of the units A–G, further described below. The supporting plate 3 is fixed to a cross head 4, guided along a pair of vertical guides 5 (only partly shown), and the cross head 4 and the supporting plate 3 as well as the table 2 are by means of various, not shown, transmission elements connected to a driving device (not shown), preferably an electric motor, in such a way that the movements of the supporting plate 3 and the table 2 have a definite mutual connection, further described below.

The operation unit A consists of a punch die 6, applied above the table 2, a steering device 7 with a notch for admitting a band 8, with a thickness of for instance 0.25 mm., of silver solder, harder silver solder, welding bronze or the like and a cutting punch 9 fixed in the supporting plate 3. The table 2 carries straight under the punching die 6 a forming die 10 with a passage 11 coaxially with the cutting punch 9 and straight through the die 10.

At the operation unit A the band 8, preferably uncoiling from a store roll, is entered between the punching die 6 and the guiding device 7. The cross head 4 and the supporting plate 3 are driven downwards and the cutting punch 9 punches or cuts a circular disc 12, see Figs. 3a, out of the band 8. The cutting punch 9 descends so far that its lower surface reaches down to or a little below the underneath side of the punching die 6 and makes sure that the disc 12 is pushed out from the punching die 6 and walls down into the forming die 10. The passage 11 of this die has a wider part 13 with a shoulder 14 on which the disc 12 comes to rest. The cutting punch 9 is thereafter pulled up to its initial position above the punching die 6.

Thereafter the table 2 is turned one step, until the forming die 10 gets under the operation unit B. This unit contains, as seen from Fig. 4, a forming punch 15 and a ring-shaped press casing 16, displaceable around this punch in an axially restricted area, the lower end of said casing descending into and filling the enlarged passage part 13. When the forming die 10 reaches the operation unit B, the even disc 12 is resting on the shoulder 14. The supporting plate 3 is then lowered, causing first the press casing 16, from its own weight or under the influence of the load, to press the disc 12 to the shoulder 14 and then the moulding punch 15 to descend towards the central part of the disc 12 and drive this part downwards. The edges of the disc 12 are by degrees drawn out of the grip of the press casing 16 and over the inner edge of the shoulder 14, this edge being rounded, so that a cylindrical edge is obtained on the formerly even disc 12, which has thus now got the form of a bowl 17, as more clearly shown in Fig. 4a. The bowl 17 is, however, left hanging in the passage 11. The table 2 is then turned a further degree, so that the forming die 10, provided with the bowl 17, gets under the operation unit C. This unit contains an inlet 18 from a bigger not shown container with a loose, pulverulent flux, such as chlorides, fluorides and borate on alkaline metals.

Under the inlet 18 a flat slide 19 is situated, connected to a driving device 20, movable up and down and attached to the driving device of the apparatus. In the slide 19 there is a hole 21, situated under the inlet 18, when the slide 19 is in its one limit position, and above a tube 22, leading to the passage 11, when the valve 19 is in its other limit position. Straight above the tube piece 22 a pusher 23 is arranged, fixed in the supporting plate 3. The driving device 20 keeps the hole 21 of the slide 19 under the inlet 18, the hole thereby being filled with flux. The slide 19 is then moved to the left in Fig. 5, until the hole 21 is above the tube piece 22, the flux thereby flowing down into the bowl 17, hanging in the passage 11. The pusher 23 is simultaneously moved down into the hole 21 and is thereby pushing down the remaining flux, if any. The bowl 17 is then partly filled with the intended portion of flux.

The table 2 is turned another step, until the forming die 10 with the flux filled bowl 17 gets under the operation unit D, see also Fig. 6. This last mentioned unit contains a punching die 24, a press device 25 with an aperture for admitting a band 26 of silver solder and a cutting punch 27 fixed in the supporting plate 3. The cutting punch 27 cuts a circular disc 28 out of the band, the diameter of which disc is somewhat smaller than the inner diameter of the bowl 17, so that the disc 28 can fall down into the bowl 17, hanging underneath.

Thereafter the table 2 is turned yet another step, until the forming die with the filled bowl gets under the operation unit E, see Fig. 7, containing a press plunger 29, suspended in the supporting plate 3. The lower part of the passage 11 of the forming die 10 forms a calibration part 30, provided with projecting axial ridges and axial grooves between these ridges. The upper ends of the ridges form small shoulders in the passage 11. The press plunger 29 descends with its lower end into the bowl 17 and presses the disc 28 against the flux, while the bowl 17 is supported by said shoulders on the ridges in the calibration part 30, thereby making sure that the plate 28 gets into the right position, shown in Fig. 7a.

The table is then turned until the forming die with the filled bowl 17 gets under the operation unit F, see also Fig. 8, containing a calibration punch 31, suspended in the supporting plate 3 and dimensioned for cooperation with the calibration part 30. This punch 31 descends into the bowl 17 and drives this bowl through the calibration part 30, the edges of the bowl thereby getting corrugated or waved, see Fig. 8a, and lock the disc 28 resting against the flux in the bowl 17. Thus, a soldering metal piece has been obtained in the form of a closed soldering metal container with flux, Fig. 8a, falling out through an outlet 33. The soldering metal piece thus obtained is intended to be applied to the end of a metal pin, stud or the like, which is to be soldered to a metal object. The walls of the soldering metal piece get an effective grip of the end of the pin or stud by means of the corrugation waves, although the grip edge in question is comparatively low.

A finished soldering metal piece having been removed from the forming die 10 at the operation unit F, the table 2 is turned one more step and the empty forming die 10 reaches the operation unit G, provided with a cylindrical brush 34, hanging down from the supporting plate 3, for cleaning the passage 11 in the forming die 10. The forming die is then again fed to the operation unit A and the described working operations continue.

The working operations have been described step by step, but as all the movable tools, pertaining to the various operation units, are suspended in the same supporting plate 3, it is evident that the described working operations take place simultaneously in all the units A–G, thus promoting a quick and continuous production of soldering metal pieces.

The described method and the apparatus may of course be varied within the scope of the invention. Thus, the forming die need not be applied in a circular table but may for instance be placed in an endless conveying belt, passing along the operation units.

What is claimed is:

1. A method of manufacturing a metallic member to be applied to the end of a metal pin comprising the steps of cutting a disc from a metal band, placing the disc in a forming die, drawing the disc to form a bowl, partially filling the bowl with flux, cutting a second disc, inserting the second disc over the flux, and forcing the bowl through a die to corrugate the wall thereof.

2. A method according to claim 1 wherein the second disc is locked within the bowl when the wall of the bowl is corrugated.

3. A flux filled metal cap adapted to be mounted on the end of a stud, comprising a substantially cylindrical metal bowl having a rounded bottom and upwardly extending vertical side walls, said bowl being at least partially filled with flux, a substantially cylindrical plane disc disposed within said bowl at the lower end of said side walls and covering said flux, said side walls having a plurality of corrugations in an axial longitudinal direction extending the entire length thereof, said corrugations locking said disc in place and imparting elasticity and resiliency to said side walls, whereby a stud may be firmly and securely gripped by said cap.

References Cited in the file of this patent

UNITED STATES PATENTS

| | | |
|---|---|---|
| 292,846 | Nye, et al. | Feb. 5, 1884 |
| 301,179 | Tice | July 1, 1884 |
| 1,996,982 | Sprague et al. | Apr. 9, 1935 |
| 2,040,088 | Jesevich | May 12, 1936 |
| 2,120,806 | Keuffel | June 14, 1938 |
| 2,352,645 | Liebmann | July 4, 1944 |
| 2,352,646 | Liebmann | July 4, 1944 |
| 2,506,747 | Smith | May 9, 1950 |
| 2,645,070 | Nicolle | July 14, 1953 |
| 2,651,154 | Nicolle | Sept. 8, 1953 |